United States Patent [19]
Rosen et al.

[11] Patent Number: 5,784,436
[45] Date of Patent: Jul. 21, 1998

[54] AUTOMATIC TELEPHONE RECORDER SYSTEM INCORPORATING A PERSONAL COMPUTER HAVING A SOUND HANDLING FEATURE

[76] Inventors: Howard B. Rosen, 1 Lyncroft Rd., Montreal PQ, Canada, H3X 3E3; Daniel S. Leitman, 11 Devoe Rd., Chappaqua, N.Y. 10414

[21] Appl. No.: 668,023

[22] Filed: Jun. 19, 1996

[51] Int. Cl.⁶ .................................................. H04M 1/64
[52] U.S. Cl. .................. 379/88; 379/79; 379/80; 379/377
[58] Field of Search .................. 379/67, 77, 78, 379/79, 80, 81, 82, 85, 86, 88, 89, 350, 372, 377; 704/215, 233, 270, 272

[56] References Cited

U.S. PATENT DOCUMENTS

| | | | |
|---|---|---|---|
| 3,794,767 | 2/1974 | Todd | 379/79 |
| 4,578,537 | 3/1986 | Faggin et al. | 379/93.09 |
| 4,598,171 | 7/1986 | Hanscom et al. | 379/80 |
| 4,623,759 | 11/1986 | Todd | 379/79 |
| 4,802,203 | 1/1989 | Muller et al. | 379/80 |
| 4,833,704 | 5/1989 | Hashimoto | 379/79 |
| 4,860,342 | 8/1989 | Danner | 379/93.28 |
| 4,916,607 | 4/1990 | Teraichi et al. | 379/88 X |
| 4,926,484 | 5/1990 | Nakano | 381/110 |
| 5,408,614 | 4/1995 | Thornton et al. | 379/93.05 X |
| 5,442,685 | 8/1995 | Sakata et al. | 379/88 |
| 5,448,420 | 9/1995 | Henits et al. | 379/88 X |
| 5,452,289 | 9/1995 | Sharma et al. | 370/32.1 |
| 5,526,407 | 6/1996 | Russell et al. | 379/89 |
| 5,526,408 | 6/1996 | Yekutiely | 379/90 |
| 5,526,423 | 6/1996 | Ohuchi et al. | 379/67 |
| 5,535,261 | 7/1996 | Brown et al. | 379/67 |
| 5,535,262 | 7/1996 | Kanzawa | 379/67 |

*Primary Examiner*—Krista Zele
*Assistant Examiner*—Scott L. Weaver
*Attorney, Agent, or Firm*—James H. Phillips

[57] ABSTRACT

An automatic telephone recorder includes a computer equipped with a sound signal handling feature and a digital recording medium such as a disk drive. The sound signal handling feature includes an audio input, an audio output and programmable means for selectively effecting digital recording on the recording medium of an audio signal applied to the sound signal handling means input. A line transformer is connected between a telephone line pair and the sound signal handling means audio input. The sound signal handling means is programmed to periodically test the sound signal handling means audio input to determine if audio or a predetermined transient signal, indicating that the telephone line has gone from an on-hook condition to an off-hook condition, is present. If the audio or transient signal is present, the sound signal handling means is programmed to institute recording of any audio signal present at the sound signal handling means audio input for as long as such audio remains. In one embodiment, a pulse stretcher circuit responds to sensing the presence of the pulse by generating a time-extended signal which the sound signal handling means can sample, thus relieving the computer from the necessity to continuously sample the transient signal source at a relatively high rate which ties up the central processor resources.

26 Claims, 4 Drawing Sheets

5,784,436

AUTOMATIC TELEPHONE RECORDER SYSTEM INCORPORATING A PERSONAL COMPUTER HAVING A SOUND HANDLING FEATURE

FIELD OF THE INVENTION

This invention relates to the art of automatic telephone recorders and, more particularly, to a system for converting a personal computer equipped with a sound card or equivalent sound signal handling feature into an automatic telephone recorder.

BACKGROUND OF THE INVENTION

While telephone conversation recorders are very well known in the art, they tend to have certain drawbacks. Many telephone conversation recording devices record messages on microcassettes, and the combined record/playback cycle results in very poor reproduction of the recorded message. In addition, these are stand alone devices which are relatively complex and therefore relatively costly, particularly when provided with a feature to periodically issue a warning beep to indicate to the remote party that the conversation is being recorded.

The microcassette on which a conversation has been recorded must be physically saved and labeled if it is desired to keep the recorded conversation permanently. To play the recorded message back, the microcassette must be found, inserted into the recording device and rewound to the point at which the message begins. These characteristics make the use of such a machine both relatively expensive and decidedly inefficient.

On the other hand, personal computers equipped with a so called sound card are very common. (Some personal computers have equivalent sound signal handling features built in.) Such sound cards have the ability to digitally record audio messages appearing on a microphone input on one of the computer's recording mediums, such as a disk drive, for later playback. Further, sound cards are programmable to obtain a wide variety of features including the sensing and handling of signal inputs at the microphone (and other) inputs and signal outputs sent to a speaker (and other) outputs. The record/playback quality of sound cards ranges from very good to that comparable to compact disk digital quality.

It will therefore be appreciated by those skilled in the art that it would be highly desirable to provide means by which a personal computer could be adapted to perform as a high quality, automatic telephone recorder.

OBJECTS OF THE INVENTION

It is therefore a broad object of this invention to provide an improved telephone recorder system.

It is a more specific object of this invention to provide a high quality, automatic telephone recorder which incorporates a personal computer equipped with a programmable sound card used in conjunction with special purpose apparatus coupled to a telephone line.

SUMMARY OF THE INVENTION

Briefly, these and other objects of the invention are achieved in a system which includes a computer incorporating sound signal handling means, such as a sound card, and a digital recording medium such as a disk drive. The exemplary conventional sound card includes an audio input, an audio output and programmable means for selectively effecting digital recording on the digital recording medium of an audio signal applied to the sound card input. Alternating current transfer means, such as a line transformer or an opto-coupler, are connected between a telephone line pair and the sound card audio input. The sound card is programmed to periodically test the sound card audio input to determine if audio or a predetermined transient signal, representative of the transient generated when a telephone line pair goes from an on-hook condition to an off-hook condition, is present. If the audio or predetermined transient signal is present, the sound card is programmed to institute recording of any audio signal present at the sound card audio input for as long as such audio signal is not interrupted for in excess of a predetermined period. In one presently preferred embodiment, a pulse stretcher circuit is employed to respond to sensing the presence of the predetermined pulse by generating a time-extended signal which the sound card can sample. This expedient relieves the computer from the necessity to continuously sample the transient signal source at a relatively high rate which ties up the central processor resources.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Preliminarily, it is well known that when a telephone line is in an on-hook state, the dc voltage across the line is relatively high, usually in the range of 25–50 volts dc, when compared to its off-hook state when the voltage across the line is usually in the range of 6–12 volts dc. However, it is also known that the audio voltage signal appearing on an off-hook telephone line is usually less than 12 volts ac. Thus, when a telephone line goes from the on-hook to the off-hook state, a large voltage pulse, readily distinguishable from voice audio, is created by the transition of the voltage appearing across the line. This known characteristic is used to advantage in practicing the present invention.

Figure 1:
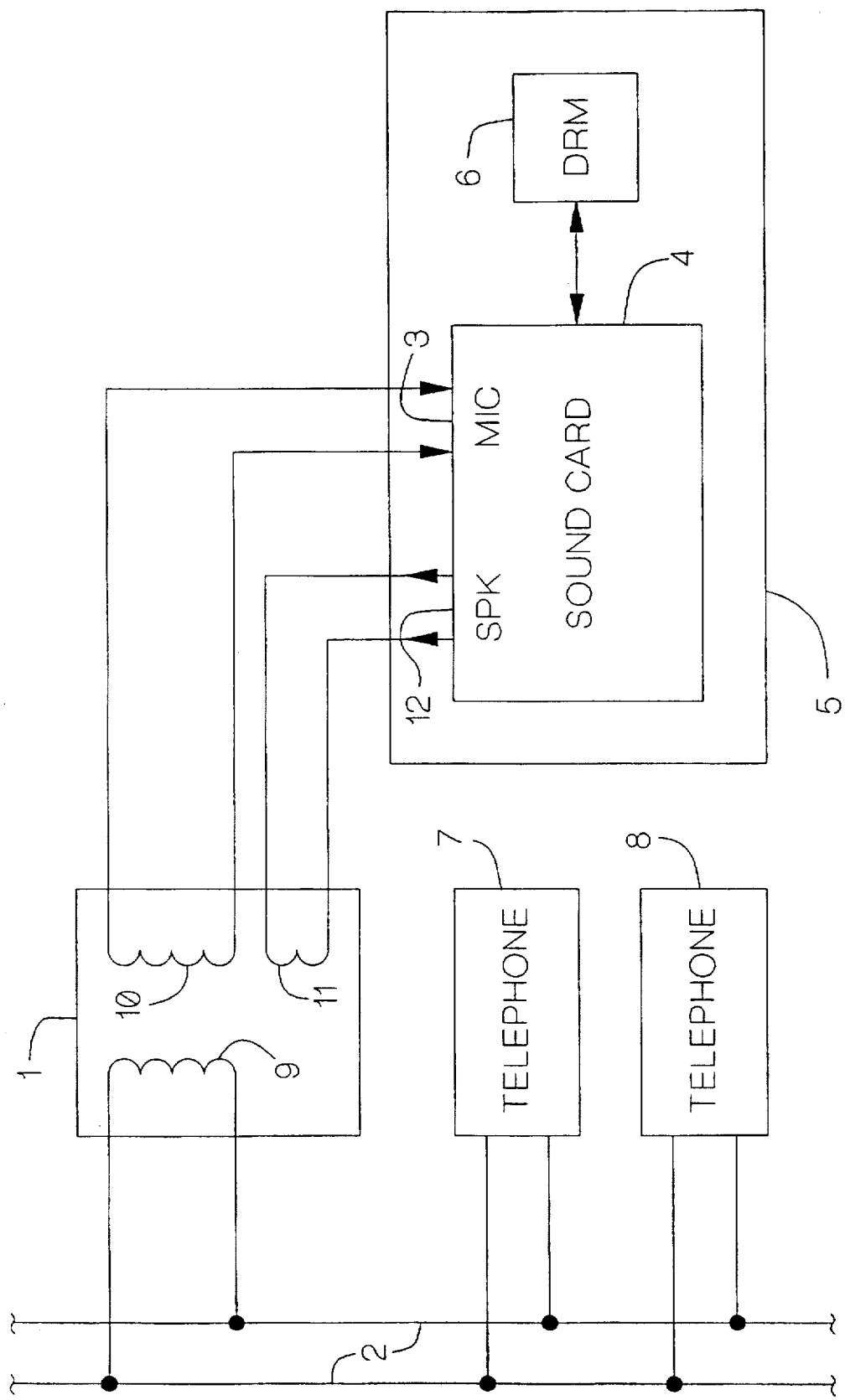
FIG. 1 is a simplified block diagram of the subject telephone recording system in its most basic form.

Referring now to FIG. 1, a simplified representation of the invention in its most basic form is shown. A line transformer 1, which serves as an alternating current transfer device, is provided with a first winding 9, a second winding 10 and a third winding 11. (Other alternating current transfer devices, such as an opto-coupler, are well known in the art and can be employed in place of the line transformer 1.) The first winding 9 is connected across a telephone line pair 2. The second winding 10 is connected to the microphone input 3 of sound signal handling means exemplified by a sound card 4 within a personal computer 5. In this basic configuration, the sound card 4 is programmed to sample the microphone input at a relatively high rate (for example, about 5 kHz) to determine if a voltage transient (which has definable frequency content characteristics) is present. If the sound card 4 detects a voltage pulse, occasioned by lifting one or the other of the telephones 7, 8 off-hook, the software controlling the sound card initiates conventional digital recording, for example, on disk drive 6, of the conversation carried out on the telephone. Thus, the telephone conversation can be played back any number of times at any future time.

Alternatively, the software controlling the sound card 4 may also (or only) cause the sound card to monitor its input for the presence of audio which is indirectly indicative of the transition of the line from an on-hook condition to an off-book condition. If audio is detected, the digital recording process is instituted as described above. One minor disadvantage of this approach to sensing the transition from on-hook to off-hook is that a short portion of the audio signal will often be lost at the beginning of the recorded conversation.

Preferably, the third winding 11 is connected to the speaker output 12 of the sound card 4. This permits reproducing the recorded telephone conversation through one or the other of the telephones 7, 8 at a later time and also facilitates transmitting an appropriate warning message to the calling party that the telephone conversation is being recorded. Thus, the sound card 4, during the recording process, is programmed to emit a subtle periodic beep sound for that purpose.

At the present state of the art, the configuration of FIG. 1 has the drawback that it tends to tie up the computer 5 because of the need to continuously sample the microphone input of the sound card 4 for the characteristic input of the voltage pulse occasioned by the transition of the line pair 2 to the off-hook condition. This drawback (which may be obviated in the future by faster computer circuitry) is overcome by the more complex circuitry shown in block diagram form in FIG. 2.

Figure 2:
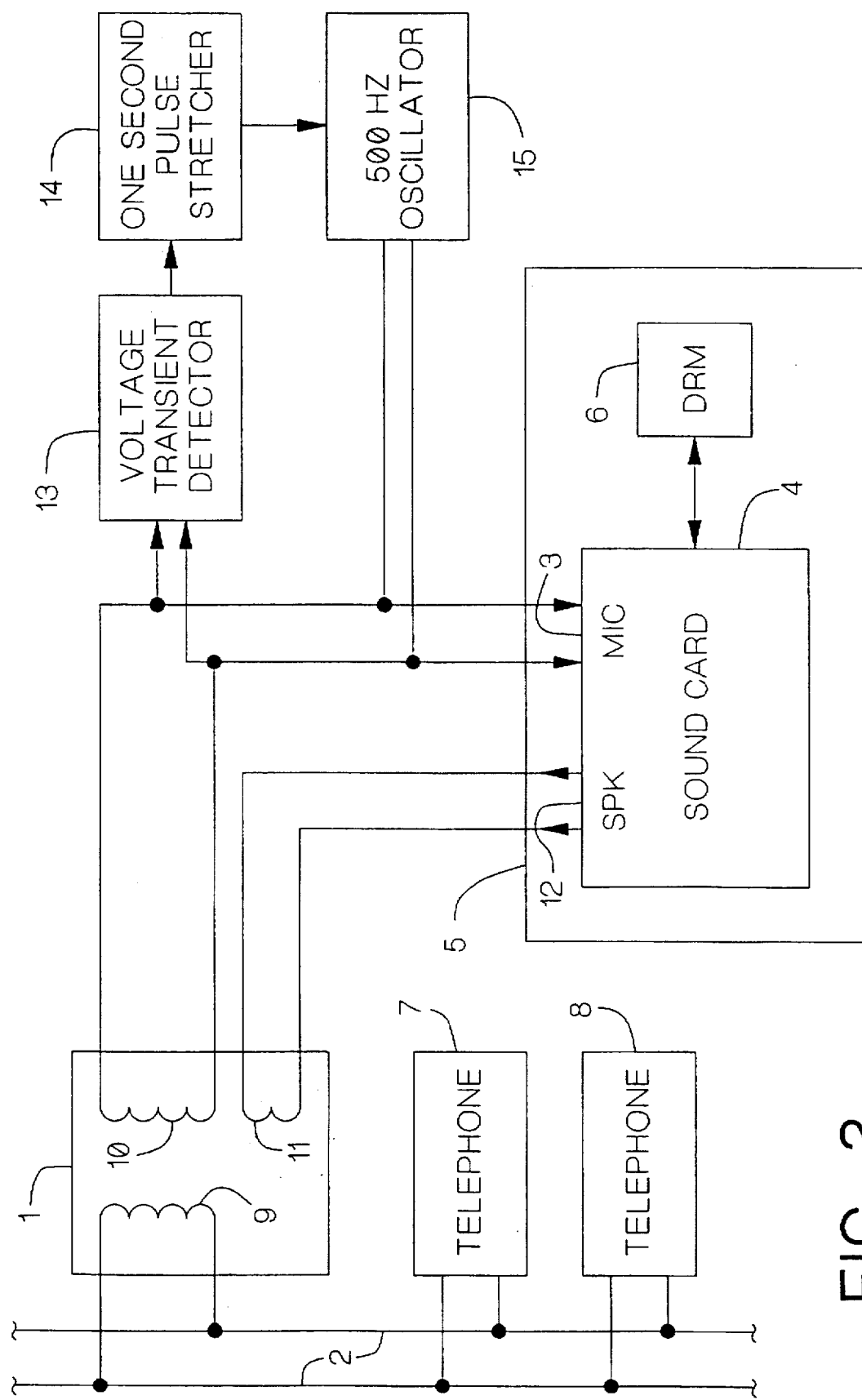
FIG. 2 is a block diagram of a presently preferred embodiment of the subject telephone recording system.

Thus, referring now to FIG. 2, a line transformer 1 includes a first 600 ohm winding 9, a second 600 ohm winding 10 and a 16 ohm winding 11. The 600 ohm winding 9 is connected to the telephone line pair 2, and the other 600 ohm winding 10 is connected to both a voltage pulse detector 13 and the microphone input 3 to the sound card 4 incorporated into the personal computer 5. The 16 ohm winding 11 of the line transformer 1 is connected to the speaker output 12 of the sound card 4. As will be explained more fully in conjunction with the description of the schematic diagram of FIG. 3, the voltage pulse detector 13 has an output connected to a one second pulse stretcher block 14 which selectively enables operation of a 500 Hz oscillator 15. The output from the 500 Hz oscillator 15 is also applied to the microphone input 3 of the sound card 4.

With this configuration, the sound card 4 can be programmed to sample for the presence of the predetermined exemplary 500 Hz tone at a very much lower rate, such as two samples per second. Thus, the personal computer 5 is substantially freed up from constantly sampling for an off-hook condition.

Figure 3:
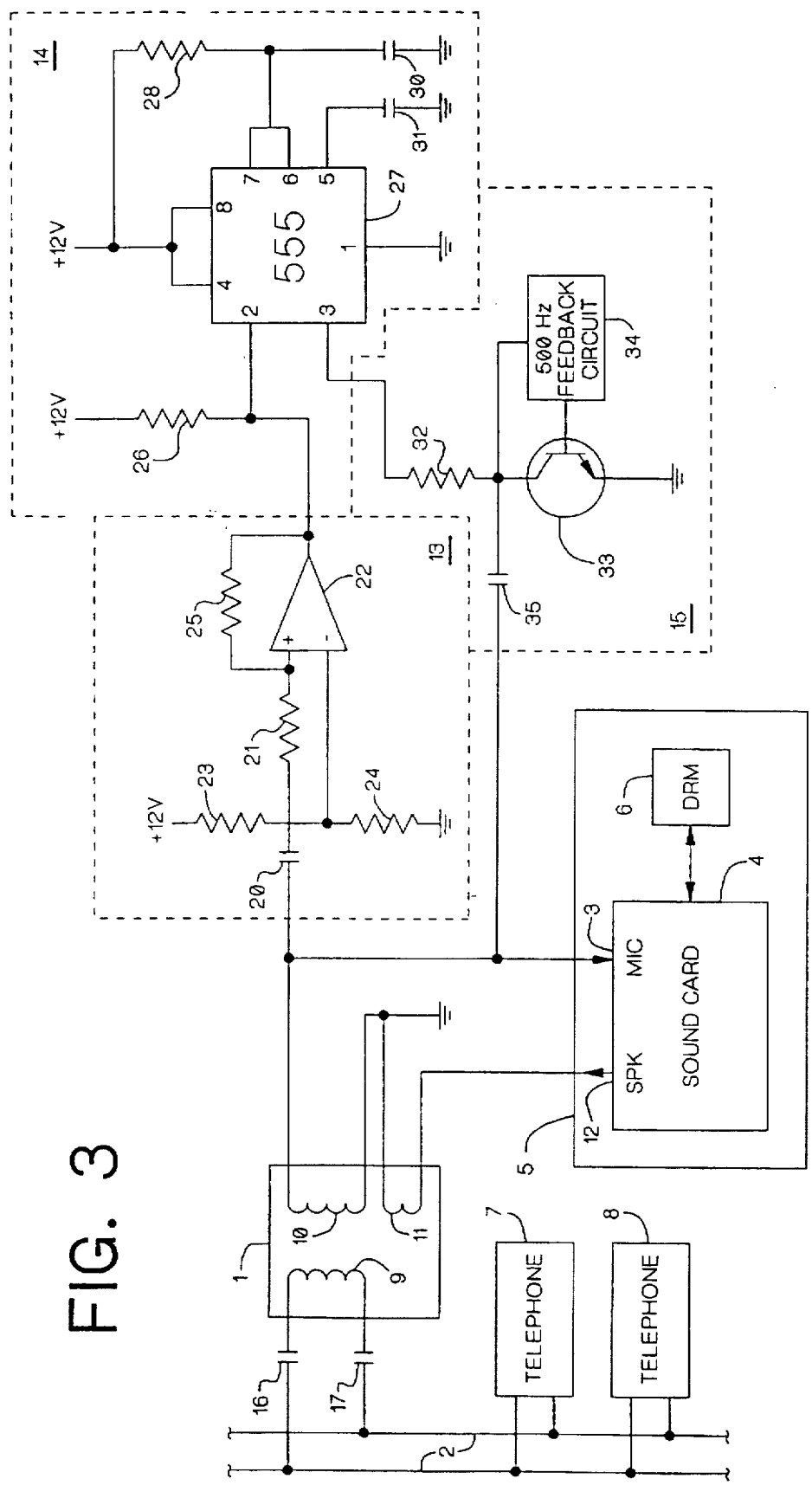
FIG. 3 is a schematic diagram illustrating details of an exemplary presently preferred embodiment of the subject telephone recording system.

FIG. 3 shows a schematic of one straightforward circuit for implementing the voltage detector 13, the one second pulse stretcher block 14 and the 500 Hz oscillator 15 of FIG. 2. More particularly, the first 600 ohm winding 9 is ac coupled to the telephone line pair 2 via blocking capacitors 16, 17. The second 600 ohm winding 10 of the line transformer 1 is ac coupled, via capacitor 20 and resistor 21, to the positive input of a conventional integrated circuit operational amplifier 22. The input to the second, reference input to the operational amplifier 22 is maintained at a constant dc voltage by its connection to the junction of resistors 23, 24 which are electrically disposed between 12 volts dc (from any appropriate power supply, not shown) and ground potential. Amplifier 22 is connected as a non-inverting amplifier with its gain set by the value of feedback resistor 25. For exemplary purposes, the value of resistor 47 may be conventionally chosen to establish a unity gain condition through the amplifier 22.

The output from the amplifier 22 is connected to the trigger input of an integrated circuit timing device (such as a type 555) 27. Those skilled in the art will recognize that the integrated circuit timer 27 is configured in FIG. 3 as a one-shot multivibrator whose "on" period can be set by appropriate selection of resistor 28 and capacitor 30. For example, an "on" period of about one second is appropriate for use in the circuit shown in block diagram form in FIG. 2, and this result can be achieved by a value of one megohms for resistor 28 and a value of one microfarad for capacitor 30. A suitable value for stabilizing capacitor 31 is 0.01 microfarads.

The trigger input of the timer 27 is normally biased at +12 volts through resistor 26. However, if a negative-going voltage pulse of sufficient amplitude appears at the input of the amplifier 22, indicative of a transition across the line pair 2 from on-hook to off-hook, the output of the amplifier 22, and hence the trigger input to the timer 27, is driven sufficiently toward ground potential (to about +4 volts in the example) to trigger the timer circuit. As a result, the output terminal from the timer 27 goes from a substantially ground potential state to about +12 volts dc for a period of one second as governed by the values selected for the capacitor 30 and the resistor 28.

The output terminal of the timer circuit 27 is connected, via a resistor 32, to the collector electrode of an NPN transistor 33 which, for example, may be a type 2N2222. A tuned positive feedback circuit 34 is connected between the gate and collector electrodes of the NPN transistor 33 to supply a positive feedback from the collector electrode to the gate electrode which causes the circuit including the transistor 33 to oscillate at a predetermined audio rate such as 500 Hz. Thus, it will be understood that as long as the output terminal of the timer circuit 27 is in the high state, as brought about by the detection of an on-hook to off-hook transition across the telephone line pair 2, the oscillator circuit issues, at the collector of transistor 33, a 500 Hz tone. This tone is coupled through blocking capacitor 35 to the microphone input 3 of the sound card 4 as previously described. It will be noted that the microphone input 3 to the sound card 4 is also connected to the second 600 ohm winding 10 of the line transformer 1 in order that normal audio signals, e.g., voice signals, may pass directly to the microphone input.

Figure 4:
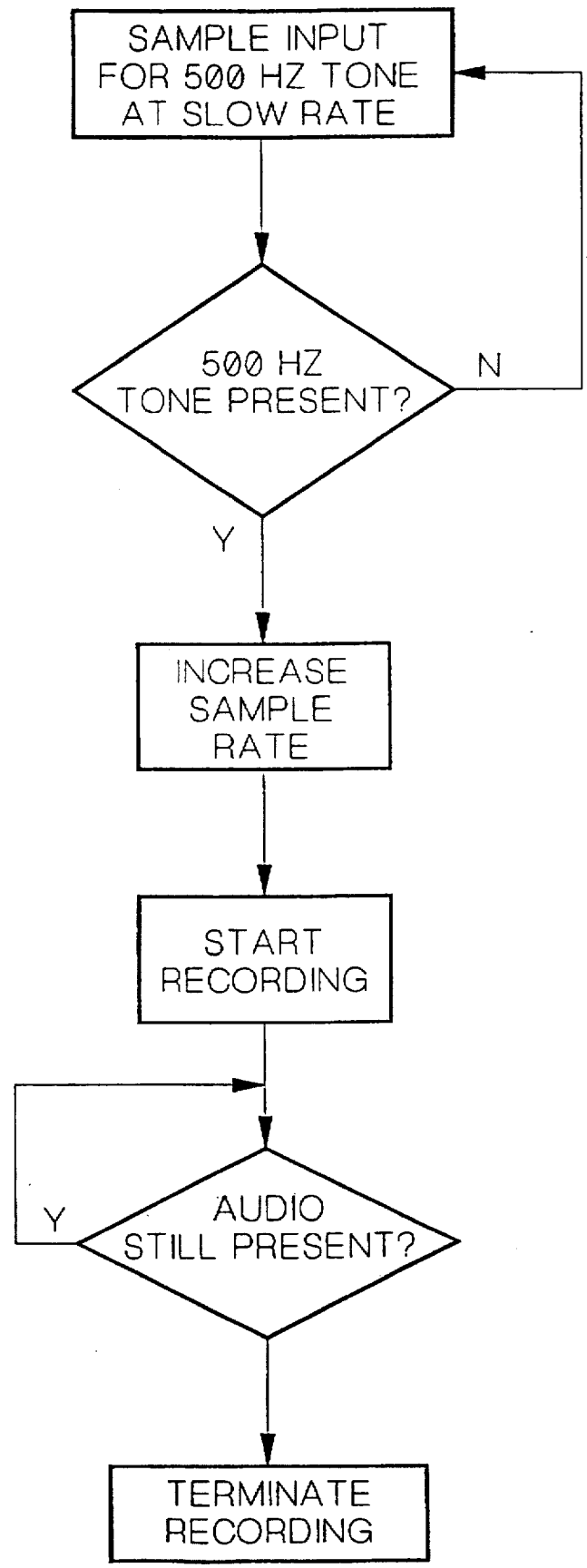
FIG. 4 is a flow chart illustrating the programming required of a sound card component of the exemplary presently referred embodiment of the invention.

The programming required for controlling the sound card to incorporate the apparatus shown in FIGS. 1, 2 and 3 may be readily understood by reference to the flow chart shown in FIG. 4. Thus, the sound card is programmed to periodically, such as twice per second, sample its microphone input for the presence of audio at a predetermined frequency, 500 Hz is the example, and if no 500 Hz tone is detected, this periodic sampling continues at minimal degradation to the performance of the computer as it carries out other tasks. However, if the presence of the 500 Hz tone is detected during a given sample period, indicating a transition from an on-hook to an off-hook condition across the telephone line, the sampling rate is increased to that which is normal for the given sound card in the record mode, and recording of the audio now appearing on the line commences. The software also continues to monitor, at a relatively slow rate, for the ongoing presence of voice audio. If none is sensed, as, for example, after the termination of a telephone conversation or if the phone is placed back in an on-hook condition, recording ceases very promptly after time-out of some predetermined period. Thereafter, the digitally recorded conversation may be played back at any future time either through the speaker(s) (not shown) normally driven by the sound card or through a telephone connected to the line. As is well known in the art, the sound card converts the digitally stored message to analog audio for this purpose.

Preferably, as previously mentioned, the sound card is programmed to record a compulsory warning tone along with the conversation being recorded and also to simultaneously issue from its speaker output (which is connected back to the telephone line via the 16 ohm winding of the line transformer) the warning tone in order that the remote party will know that the telephone conversation is being recorded.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An automatic telephone recorder system comprising:
   A) a computer including a sound signal handling means and a digital recording medium, said sound signal handling means including an audio input and means for selectively effecting digital recording on said digital recording medium of an audio signal applied to said sound signal handling means input;
   B) alternating current transfer means connected between a telephone line pair and said sound signal handling means audio input;
   C) said sound signal handling means being programmed to:
      1) periodically test the sound signal handling means audio input to determine if an on-hook to off-hook transition has taken place on the telephone line pair; and
      2) if said on-hook to off-hook transition on the telephone line pair is detected, instituting digital recording on said digital recording medium of any audio signal present at said sound signal handling means audio input for as long as such audio signal is not interrupted for in excess of a predetermined period.

2. The automatic telephone recorder system of claim 1 in which said alternating current transfer means comprises a line transformer having at least first and second windings coupled, respectively, to said telephone line pair and said sound signal handling means audio input.

3. The automatic telephone recorder system of claim 1 in which said digital recording medium comprises a disk drive.

4. The automatic telephone recorder system of claim 2 in which said digital recording medium comprises a disk drive.

5. An automatic telephone recorder system comprising:
   A) a computer including a sound signal handling means and a digital recording medium, said sound signal handling means including an audio input and means for selectively effecting digital recording on said digital recording medium of an audio signal applied to said sound signal handling means input;
   B) alternating current transfer means connected between a telephone line pair and said sound signal handling means audio input, said alternating current transfer means comprising a line transformer having first and second windings coupled, respectively, to said telephone line pair and said sound signal handling means audio input;
   C) said sound signal handling means being programmed to:
      1) periodically test the sound signal handling means audio input to determine if a predetermined transient signal is present; and
      2) if said predetermined transient signal is present, instituting recording of any audio signal present at said sound signal handling means audio input for as long as such audio signal is not interrupted for in excess of a predetermined period;
   D) said sound signal handling means further including an audio output adapted to selectively issue messages digitally recorded on said digital recording medium as analog audio signals and said line transformer includes a third winding connected to said audio output.

6. The automatic telephone recorder system of claim 5 in which said digital recording medium comprises a disk drive.

7. An automatic telephone recorder system comprising:
   A) a computer including a sound signal handling means and a digital recording medium, said sound signal handling means including an audio input and means for selectively effecting digital recording on said digital recording medium of an audio signal applied to said sound signal handling means input;
   B) a pulse stretcher and oscillator circuit adapted to respond to the transient presence of a voltage pulse by issuing an audio tone at a predetermined frequency for a first predetermined period;
   C) alternating current transfer means connected between a telephone line pair and said sound signal handling means audio input and coupled between said telephone line pair and an input to said pulse stretcher circuit;
   D) means coupling said audio tone from said oscillator to said sound signal handling means audio input;
   E) said sound signal handling means being programmed to:
      1) periodically test the sound signal handling means audio input to determine if a predetermined transient signal is present as indicated by the presence of said audio tone from said oscillator; and
      2) if said predetermined transient signal is present, instituting recording of any audio signal present at said sound signal handling means audio input for as long as such audio signal is not interrupted for in excess of a second predetermined period.

8. The automatic telephone recorder system of claim 7 in which said alternating current transfer means comprises a line transformer having at least first and second windings coupled, respectively, to said telephone line pair and said sound signal handling means audio input.

9. The automatic telephone recorder system of claim 8 in which said sound signal handling means includes an audio output adapted to selectively issue messages digitally recorded on said digital recording medium as analog audio signals and said line transformer includes a third winding connected to said audio output.

10. The automatic telephone recorder system of claim 7 in which said digital recording medium comprises a disk drive.

11. The automatic telephone recorder system of claim 8 in which said digital recording medium comprises a disk drive.

12. The automatic telephone recorder system of claim 9 in which said digital recording medium comprises a disk drive.

13. The automatic telephone recorder system of claim 8 in which said second winding of said line transformer is also coupled to said input to said pulse stretcher circuit.

14. The automatic telephone recorder system of claim 13 in which said sound signal handling means includes an audio output adapted to selectively issue messages digitally recorded on said digital recording medium as analog audio signals and said line transformer includes a third winding connected to said audio output.

15. The automatic telephone recorder system of claim 13 in which said digital recording medium comprises a disk drive.

16. The automatic telephone recorder system of claim 14 in which said digital recording medium comprises a disk drive.

17. The automatic telephone recorder of claim 7 in which said first predetermined period is one second.

18. The automatic telephone recorder of claim 8 in which said first predetermined period is one second.

19. The automatic telephone recorder of claim 13 in which said first predetermined period is one second.

20. The automatic telephone recorder of claim 7 in which said sound signal handling means is further programmed to record and emit a periodic warning beep during recording of said audio signal.

21. An automatic telephone recorder system comprising:
   A) a computer including a sound signal handling means and a digital recording medium, said sound signal handling means including an audio input and means for selectively effecting digital recording on said digital recording medium of an audio signal applied to said sound signal handling means input;
   B) alternating current transfer means connected between a telephone line pair and said sound signal handling means audio input;
   C) said sound signal handling means being programmed to:
      1) periodically test the sound signal handling means audio input to determine if a voice signal is present on the telephone line pair; and
      2) if said voice signal is present on the telephone line pair, instituting digital recording thereof on said digital recording medium for as long as said voice signal is not interrupted for in excess of a predetermined period.

22. The automatic telephone recorder system of claim 21 in which said alternating current transfer means comprises a line transformer having at least first and second windings coupled, respectively, to said telephone line pair and said sound signal handling means audio input.

23. The automatic telephone recorder system of claim 21 in which said digital recording medium comprises a disk drive.

24. The automatic telephone recorder system of claim 22 in which said digital recording medium comprises a disk drive.

25. An automatic telephone recorder system comprising:
   A) a computer including a sound signal handling means and a digital recording medium, said sound signal handling means including an audio input and means for selectively effecting digital recording on said digital recording medium of an audio signal applied to said sound signal handling means input;
   B) alternating current transfer means connected between a telephone line pair and said sound signal handling means audio input, said alternating current transfer means comprising a line transformer having first and second windings coupled, respectively, to said telephone line pair and said sound signal handling means audio input;
   C) said sound signal handling means being programmed to:
      1) periodically test the sound signal handling means audio input to determine if an audio signal is present; and
      2) if said audio signal is present, instituting recording thereof for as long as said audio signal is not interrupted for in excess of a predetermined period;
   D) said sound signal handling means further including an audio output adapted to selectively issue messages digitally recorded on said digital recording medium as analog audio signals and said line transformer includes a third winding connected to said audio output.

26. The automatic telephone recorder system of claim 25 in which said digital recording medium comprises a disk drive.

* * * * *

UNITED STATES PATENT AND TRADEMARK OFFICE
CERTIFICATE OF CORRECTION

PATENT NO. : 5,784,436
DATED : July 21, 1998
INVENTOR(S) : Rosen et al.

It is certified that error appears in the above-identified patent and that said Letters Patent is hereby corrected as shown below:

On the title page, item [56], add the following,

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 9 | 2 | 3 | 3 | 4 | 02/21/95 | O'Mahony | | | |
| | | 5 | 5 | 0 | 6 | 8 | 9 | 1 | 04/09/96 | Brown | | | |
| | | | | | | | | | | | | | |

Signed and Sealed this

Fourth Day of May, 1999

Attest:

Attesting Officer

Q. TODD DICKINSON

Acting Commissioner of Patents and Trademarks